(12) United States Patent
Jedlitschka

(10) Patent No.: US 8,911,860 B2
(45) Date of Patent: Dec. 16, 2014

(54) ELECTRICALLY INSULATING MATERIAL, PARTICULARLY FOR HIGH VOLTAGE GENERATOR

(75) Inventor: Hans Jedlitschka, Chatillon (FR)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 13/485,106

(22) Filed: May 31, 2012

(65) Prior Publication Data

US 2012/0305289 A1  Dec. 6, 2012

(30) Foreign Application Priority Data

Jun. 1, 2011  (FR) ...................................... 11 01694

(51) Int. Cl.
- *B32B 5/16* (2006.01)
- *F16B 33/00* (2006.01)
- *H01B 3/00* (2006.01)
- *H01B 3/44* (2006.01)
- *C08L 23/02* (2006.01)

(52) U.S. Cl.
CPC ................ *H01B 3/004* (2013.01); *H01B 3/441* (2013.01); *C08L 23/02* (2013.01)
USPC ........... 428/323; 428/220; 428/328; 428/332; 174/138 R

(58) Field of Classification Search
None
See application file for complete search history.

(56) References Cited

U.S. PATENT DOCUMENTS 7,863,366 B2 * 1/2011 Dupire et al. .................. 524/424

\* cited by examiner

*Primary Examiner* — Sheeba Ahmed
(74) *Attorney, Agent, or Firm* — GE Global Patent Operation; Mark A. Conklin

(57) ABSTRACT

An electrically insulating material for high voltage generators is provided. The electrically insulating material comprises a polymer based dielectric material filled with nanoparticles, wherein the voltage at which partial discharges start in the polymer based dielectric material is greater than the voltage at which partial discharges start in an unfilled polymer based dielectric material.

8 Claims, 2 Drawing Sheets

ELECTRICALLY INSULATING MATERIAL, PARTICULARLY FOR HIGH VOLTAGE GENERATOR

BACKGROUND OF THE INVENTION

1. Field of the Invention

Embodiments of the invention relate generally to the field of electrically insulating materials, particularly of the dielectric type. Embodiments of the present invention may be applied in particular to electrically insulating materials for high voltage generators, used for example in the medical imaging field.

2. Description of the Related Art

Numerous electrically insulating materials have been developed, particularly to ensure the insulation of high voltage generators, supplying for example, X-ray tubes used in medical imaging.

A known polymer based dielectric material in use today is polypropylene combined with talc. These types of insulators can withstand a very strong electric field. For example, they can be subjected to voltages of the order of 80 kV/cm.

However, above a certain voltage value (known as "start" voltage), partial discharges begin through the material and the polymer degrades irreversibly, as does its insulation properties.

Because the currents dig into the material, certain molecules of the polymer undergo a rearrangement of the polymer molecules, which progressively degrades the insulation capacities thereof, up to its breakdown.

However, increases in power are required to increase the frequency at which this type of device may take images. This requires increasing the voltage delivered by the high voltage generators, while minimizing the weight of the generators because they are typically mounted on the scanner.

In addition, smaller and smaller dimensions are required for high voltage generators, in order to increase the rate at which images may be taken with the imaging devices on which they are mounted. This requires that the voltage delivered by the generators be increased, while minimizing the weight of the generators, because they are mounted on scanners.

Consequently, there exists a need to develop novel electrically insulating materials, capable of withstanding ever stronger electrical fields without overloading the generators on which they are mounted.

BRIEF SUMMARY OF THE INVENTION

According to an embodiment of the invention, an electrically insulating material for high voltage generators is provided. The electrically insulating material comprises a polymer based dielectric material filled with nanoparticles, wherein the voltage at which partial discharges start in the polymer based dielectric material is greater than the voltage at which partial discharges start in an unfilled polymer based dielectric material. According to another embodiment of the invention a high voltage generator is provided. The high voltage generator comprises an electrically insulating material, the electrically insulating material comprising a polymer based dielectric material filled with nanoparticles, wherein the voltage at which partial discharges start in the polymer based dielectric material is greater than the voltage at which partial discharges start in an unfilled polymer based dielectric material.

BRIEF DESCRIPTION OF DRAWINGS

Other characteristics, aims and advantages of embodiments of the present invention will become more clear from reading the detailed description that follows, with reference to the appended drawings, given by way of non-limiting examples, and among which.

DETAILED DESCRIPTION OF THE INVENTION

Figure 1:
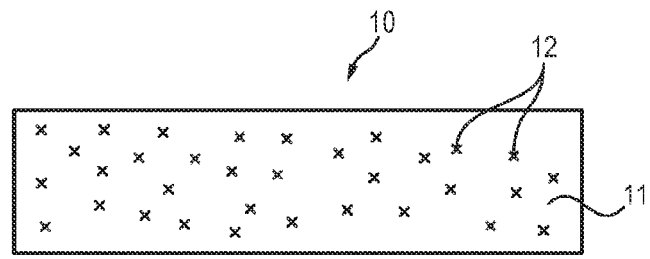
FIG. 1 schematically represents a material according to an embodiment of the invention.

With reference to FIG. 1, an electrically insulating material 10 is shown that may be used, for example, in high voltage generators. This insulating material 10 is a polymer based dielectric 11, for example, based on polypropylene or instead polyethylene. However, other resins may be envisaged.

In addition, the electrically polymer 10 material is filled with electrically conducting nanoparticles 12. Carbon nanotubes, which are very good electrical conductors, may be utilized and possibly supplemented with other nanoparticles such as, for example, nano-oxides of titanium or nanoparticles of boron nitrite.

In the case of electric insulation applications of high voltage generators, the dielectric permittivity of the filled polymer is chosen as close as possible to that of the insulating oil used (dielectric permittivity may be between about 2.2 and about 3.0, preferentially between about 2.3 and about 2.8).

The nanoparticles 12 added to the material, which have good thermal properties, also allow it to be a better thermal conductor than a polymer based material alone. For example, for an insulating material 10 comprising less than 1% by weight of carbon nanotubes, the thermal conductivity of the insulating material 10 is greater than or equal to about 0.6 $W.m^{-1}.K^{-1}$. In comparison, an insulating material based on polymer alone has a thermal conductivity of the order of about 0.2 $W.m^{-1}.K^{-1}$. The addition of nanoparticles of boron nitrite, for example, enables the thermal conductivity of the material to be further increased.

As mentioned above, an unfilled polymer based material undergoes aging when it is subjected to an electric field exceeding a threshold voltage, known as "start" voltage. Voltages above the "start" voltage cause partial electrical discharges to occur in the material, which leads to irremediable breakdown of the polymer. This phenomenon is linked to a rearrangement of the molecules of the polymer 11 under the constraints of the electric field.

However, the insulating material 10 containing electrically conducting nanoparticles 12 allows partial discharge currents to propagate through the insulating material 10 when it is subjected to strong electrical fields, which reduces the stresses applied to the molecules of the polymer 11.

This results in several interesting properties of the nanoparticle 12 containing insulating material 10.

Firstly, the nanoparticles 12 "shunt" the electrical insulation and the insulating material 10 is in fact less insulating than an unfilled polymer based material. For example, for a proportion of nanoparticles 12 less than 1% by weight of the total insulating material 10, the insulation resistance of the filled material 10 is two orders of magnitude less than the insulation resistance of the unfilled polymer. However, the insulation resistance of the filled material 10 remains sufficient to ensure the insulation of high voltages. As a result the filled insulating material 10 may still be used for the insulation of high voltages, for example, in high voltage generators.

On the other hand, the "shunt" that the nanoparticles 12 allow, particularly those based on carbon, make it possible for the first partial discharges to take place at voltages that are higher for the insulating material 10 filled with nanoparticles 12 than for the same unfilled polymer based material. The discharge currents permitted by the nanoparticles 12 increase the resistance of the polymer 11 to strong electric fields. In this case, utilizing the test that is described below with reference to FIG. 2, the "start" voltage at which the first discharges were detected was of the order of about 30 kV or greater for a material filled with carbon nanoparticles (proportion by weight of 1% or less). In comparison, the "start" voltage was of the order of about 27 kV for the same unfilled material. Moreover the filled material has a dielectric strength 30% higher than that of the same unfilled material. Furthermore, the life before breakdown, after the first discharges started, was considerably increased for nanoparticle filled materials.

Figure 2:
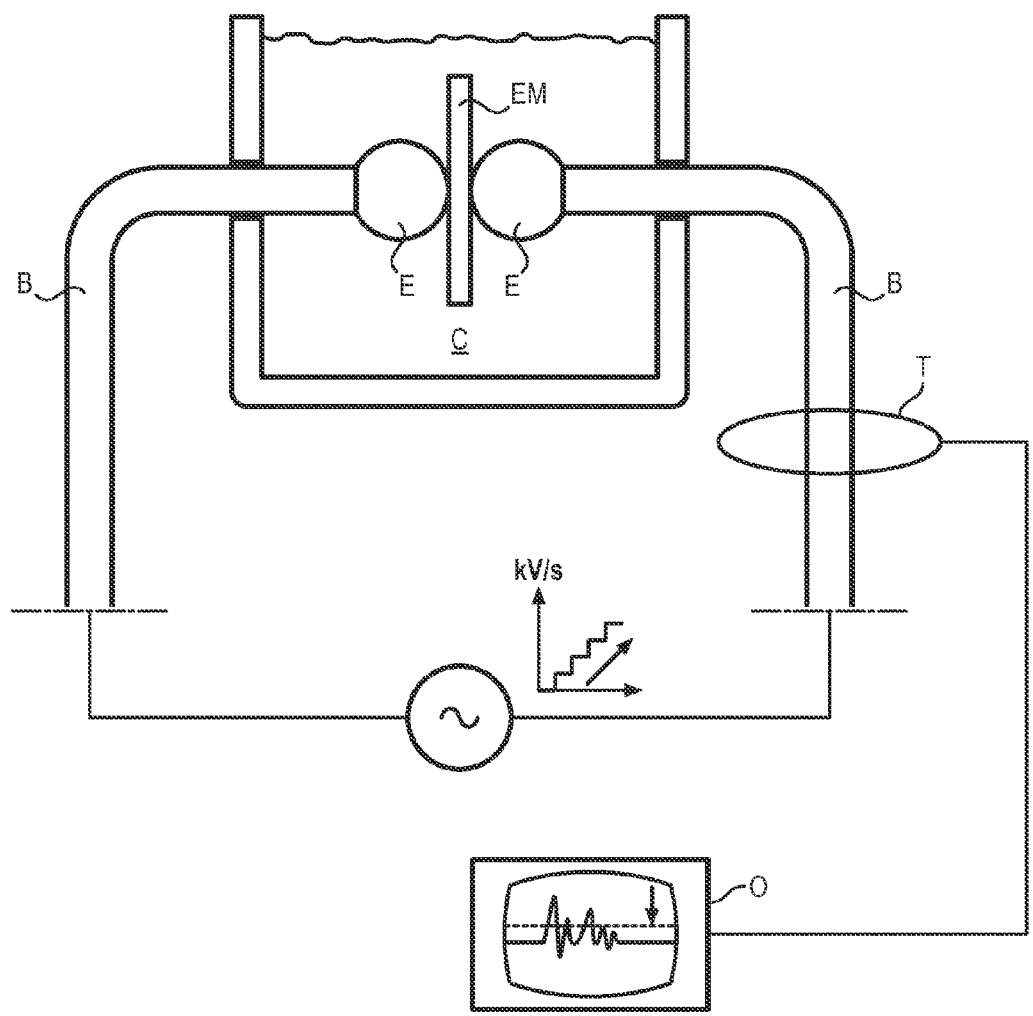
FIG. 2 illustrates a test assembly to determine the "start" voltage or the life of a given material according to an embodiment of the present invention.

The tests for determining the "start" voltage at which the discharges start, as well as for determining the life of the polymer once the "start" voltage is reached, for example, are carried out by utilizing an oil insulation tester, such as the "BAUR Prüf- and Messtechnik GmbH" by the Baur Company. The assembly is shown in FIG. 2. A sample EM of the material to be tested is placed between two metal electrodes E facing the tester. The sample EM is a square plate with width of about 2 mm and sides of several centimeters. The electrodes E are spherical electrodes with a diameter of about 12 mm at the end of two arms B that plunge into a glass tank C filled with insulating oil. The two electrodes E and the sample of material EM are thus immersed in the insulating oil, and supplied with high voltage (50 Hz true) via the two arms B.

Figure 3:
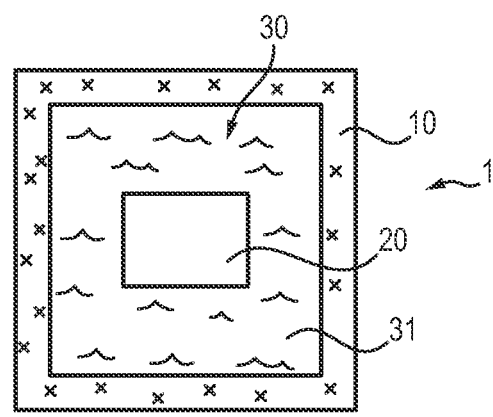
FIG. 3 schematically represents a sectional view of a high voltage generator, the insulation of which is provided by a material according to an embodiment of the present invention.

A current transformer T (sensitivity 100 mV/A), which is mounted on one of the arms, is equipped with threshold detection means and returns an input signal to an oscilloscope O. The test for determining the "start" voltage consists of increasing the voltage applied to the electrodes with a gradient of about 0.5 Kv/s. The "start" voltage is the point at which a current is detected for the first time above an intensity threshold given by the oscilloscope O (first significant discharges). In a first experiment, the voltage at the terminals of the electrodes E rises with the same gradient of about 0.5 kV/s to determine the voltage, known as the "stop" voltage, at which breakdown occurs. In another experiment, the supply voltage is set at the "start" voltage and the life between the start of the first discharges and the definitive breakdown of the sample is determined FIG. 3 illustrates a high voltage generator 1 in which the insulating material 10 described above is used. The generator 1 comprises one or more transformer(s) 20 placed in an oil bath 30, the whole assembly being enclosed in one or more housing(s) made of insulating material 10 that form for example an insulating sock.

The insulating material 10 of the casing(s) is of the type described above. For example, an insulating material 10 based on polypropylene or polyethylene, or even other resins, filled with less than 1% by weight of nanoparticles 12, for example carbon nanoparticles, and having a "start" voltage at which the first electrical discharges appear in the material greater than the same unfilled material. Such a material makes it possible to increase the image taking frequency while minimizing the weight of the generator and maintaining efficient insulation. Furthermore, the cooling of the generator 1 is more efficient with this insulating material 10, which further extends its lifetime. The more efficient cooling and insulation provided by the insulating material 10 make it possible to reduce the insulation volume in the generator 1, thereby reducing the weight of the generator 1.

For medical type applications such as, for example, the use of high voltage generators for X-ray tubes mounted on scanners, the ability to reduce the weight of the generator makes it possible to accelerate the rate of rotation of the scanners, and therefore, to reduce the examination time for a patient.

Of course, the insulation material 10 and the high voltage generator 1 described above are not restricted to medical applications.

What is claimed is:

1. An electrically insulating material for high voltage generators, the electrically insulating material comprising:
    a polymer based dielectric material having dielectric permittivity between about 2.2 and about 3.0 filled with nanoparticles comprising nano-oxides of titanium or boron nitrite, wherein the voltage at which partial discharges start in the polymer based dielectric material is greater than the voltage at which partial discharges start in an unfilled polymer based dielectric material and wherein the quantity of nanoparticles does not exceed 1% by weight of the polymer based dielectric material.

2. The material according to claim 1, wherein the nanoparticles are electrically conducting.

3. The material according to claim 1, wherein the nanoparticles comprise carbon nanotubes.

4. The material according to claim 1, wherein the polymer comprises polypropylene.

5. The material according to claim 1, wherein the polymer comprises polyethylene.

6. The material according to claim 1, wherein the dielectric permittivity of the polymer based dielectric material is between about 2.3 and about 2.8.

7. The material according to claim 1, having a thermal conductivity greater than about $0.6\ \text{W.m}^{-1}.\text{K}^{-1}$.

8. A high voltage generator comprising an electrically insulating material, the electrically insulating material comprising a polymer based dielectric material having dielectric permittivity between about 2.2 and about 3.0 filled with nanoparticles comprising nano-oxides of titanium or boron nitrite, wherein the voltage at which partial discharges start in the polymer based dielectric material is greater than the voltage at which partial discharges start in an unfilled polymer based dielectric material and wherein the quantity of nanoparticles does not exceed 1% by weight of the polymer based dielectric material.

* * * * *